United States Patent [19]
Janecke

[11] Patent Number: 5,436,833
[45] Date of Patent: Jul. 25, 1995

[54] SHIFT-TO-NEUTRAL REMINDER PROMPT SYSTEM/METHOD

[75] Inventor: Daniel P. Janecke, Kalamazoo, Mich.

[73] Assignee: Eaton Corporation, Cleveland, Ohio

[21] Appl. No.: 117,280

[22] Filed: Sep. 7, 1993

[51] Int. Cl.[6] .................................................. B60K 20/00
[52] U.S. Cl. .............................. 364/424.1; 364/424.01; 477/120; 477/904; 477/124; 477/122; 74/335; 74/336 R
[58] Field of Search ..................... 364/424.1, 424.01; 477/124, 904, 122, 125, 120, 110; 74/335, 336 R

[56] References Cited

U.S. PATENT DOCUMENTS

| | | | |
|---|---|---|---|
| 5,050,079 | 9/1991 | Steeby | 74/335 |
| 5,053,959 | 10/1991 | Genise | 364/424.1 |
| 5,053,961 | 10/1991 | Genise | 364/424.1 |
| 5,053,962 | 10/1991 | Genise | 364/424.1 |
| 5,063,511 | 11/1991 | Mack et al. | 364/424.1 |
| 5,089,962 | 2/1992 | Steeby | 74/336 R |
| 5,089,965 | 2/1992 | Braun | 477/125 |
| 5,105,357 | 4/1992 | Steeby | 364/424.1 |
| 5,315,514 | 5/1994 | Steedy et al. | 364/424.1 |

Primary Examiner—Kevin J. Teska
Assistant Examiner—Jacques H. Louis-Jacques
Attorney, Agent, or Firm—Howard D. Gordon

[57] ABSTRACT

A control system (104)/method for semi-automatically executing automatically and manually selected upshifts and downshifts of a mechanical transmission system (10) is provided. The control system includes a central processing unit (106) for receiving input signals indicative of transmission input shaft (16) and output shaft (90) speeds and from a driver control console (108) and processing the same in accordance with predetermined logic rules to issue command output signals to a transmission actuator (112, 70, 96) to implement the selected shifts. The control is effective to initiate a shift by automatically preselecting a shift from the currently ratio into neutral and to then await a manually caused torque break of the transmission to complete the shift to neutral. The control is effective to minimize wear by issuing repetitive shift prompts if transmission neutral is not sensed within predetermined times from preselection of a shift frown a currently engaged ratio (GR) into neutral(N).

20 Claims, 4 Drawing Sheets

SHIFT-TO-NEUTRAL REMINDER PROMPT SYSTEM/METHOD

BACKGROUND OF THE INVENTION

1. Field of the Invention

The present invention relates to vehicular semi-automated mechanical transmission systems of the type responding to a manually or automatically selected shift from a currently engaged gear ratio into a target gear ratio by automatically biasing the transmission to be shifted from the currently engaged gear into neutral and thereafter requiting a manual intervention to cause a drive train torque break to allow the shift into neutral to occur, and, in particular, relates to a control system/method for the above-described type of semi-automated mechanical transmission system which will, until a shift into neutral is confirmed, repetitively prompt the vehicle operator to manually cause a torque break.

2. Description of the Prior Art

Vehicular partially automated mechanical transmission systems wherein automatically or manually selected shifts of the mechanical transmission are semi-automatically implemented in a system having a manually only controlled engine throttle means and a manually only controlled master clutch are known in the prior an as may be seen by reference to U.S. Pat. Nos. 5,053,961 and 5,053,962, both assigned to the assignee of this invention, Eaton Corporation, and the disclosures of both of which are incorporated herein by reference.

The partially automatic shift implementation systems, which do not require automatically controlled throttle or clutch actuators, preferably have at least one mode of operation wherein the shifts to be semi-automatically implemented are automatically preselected. The systems include an electronic control unit (ECU) which, in the automatic preselect mode is effective for receiving input signals indicative of transmission input and output shaft speeds and for processing same in accordance with predetermined logic rules to determine if an upshift or downshift from the currently engaged ratio is required and to issue command output signals to a transmission actuator for shifting the transmission in accordance with the command output signals.

Upon automatic or manual selection of a shift from a current gear ratio into a target gear ratio, the control unit would automatically preselect a shift from the current gear into neutral by biasing the shift actuators to disengage the jaw clutch associated with the currently engaged ratio. However, as is well known, due to "torque lock", engaged jaw clutch members will not disengage until a drive train "torque break" or torque reversal is caused. Due to the lack of throttle and master clutch automated actuators, the vehicle operator is usually required to manually cause a non-torque lock condition by manipulation of the throttle pedal and/or momentary disengagement of the master clutch.

In the prior art systems, upon initiation of a shift from a currently engaged gear ratio, the operator is prompted or alerted, usually audibly by a single tone, that a shift has been selected. If the drive misses the tone, or forgets the warning, the driver may be unaware that the transmission is preselected toward neutral which may result in additional wear of the shift forks, shifting mechanism and/or electronic shift control unit due to extended preselect times.

SUMMARY OF THE INVENTION

In accordance with the present invention, the drawbacks of the prior art are overcome by the provision in a semi-automatic shift implementation mechanical transmission system wherein preselection of shift into neutral is automatic and manual manipulation of the throttle and/or master clutch is required to relieve torque lock conditions, of a repetitive shift prompt to alleviate extended time periods in the preselect condition due driver inattention and thus minimize wear caused thereby. According to the present invention, if a given amount of time passes alter preselection of a shift to neutral without a shift to neutral being completed and confirmed then periodic repeating of the shift prompt (audible tone) will remind the driver that a shift to neutral has been preselected. The same shift prompt may be repeated or an alternative tone may be used to alert the driver. The shift prompt may be repeated at fixed time intervals or at decreasing intervals to solicit driver action. By repeating the shift prompt the driver is encouraged to complete or to cancel the shift. Either way, the frequency of extended preselect times may be decreased using this approach.

The preferred method of implementation of this strategy is to provide a single, initial preselect tone and then a double tone at intervals of 20 seconds until the transmission is pulled out of gear. The audible prompts may be supplemented or replaced by visual and/or tactile signals to the operator.

Accordingly, it is an object of the present invention, in a vehicular semi-automatic mechanical transmission system for partially automatic implementation of automatically selected transmission shifts which does not require throttle or clutch actuators, to minimize wear caused by extended periods in the preselect to neutral condition by providing repetitive shift prompts to the vehicle operator.

This and other objects and advantages of the present invention will become apparent from a reading of the detailed description of the preferred embodiment taken in connection with the attached drawings.

DESCRIPTION OF THE PREFERRED EMBODIMENT

Figure 1:
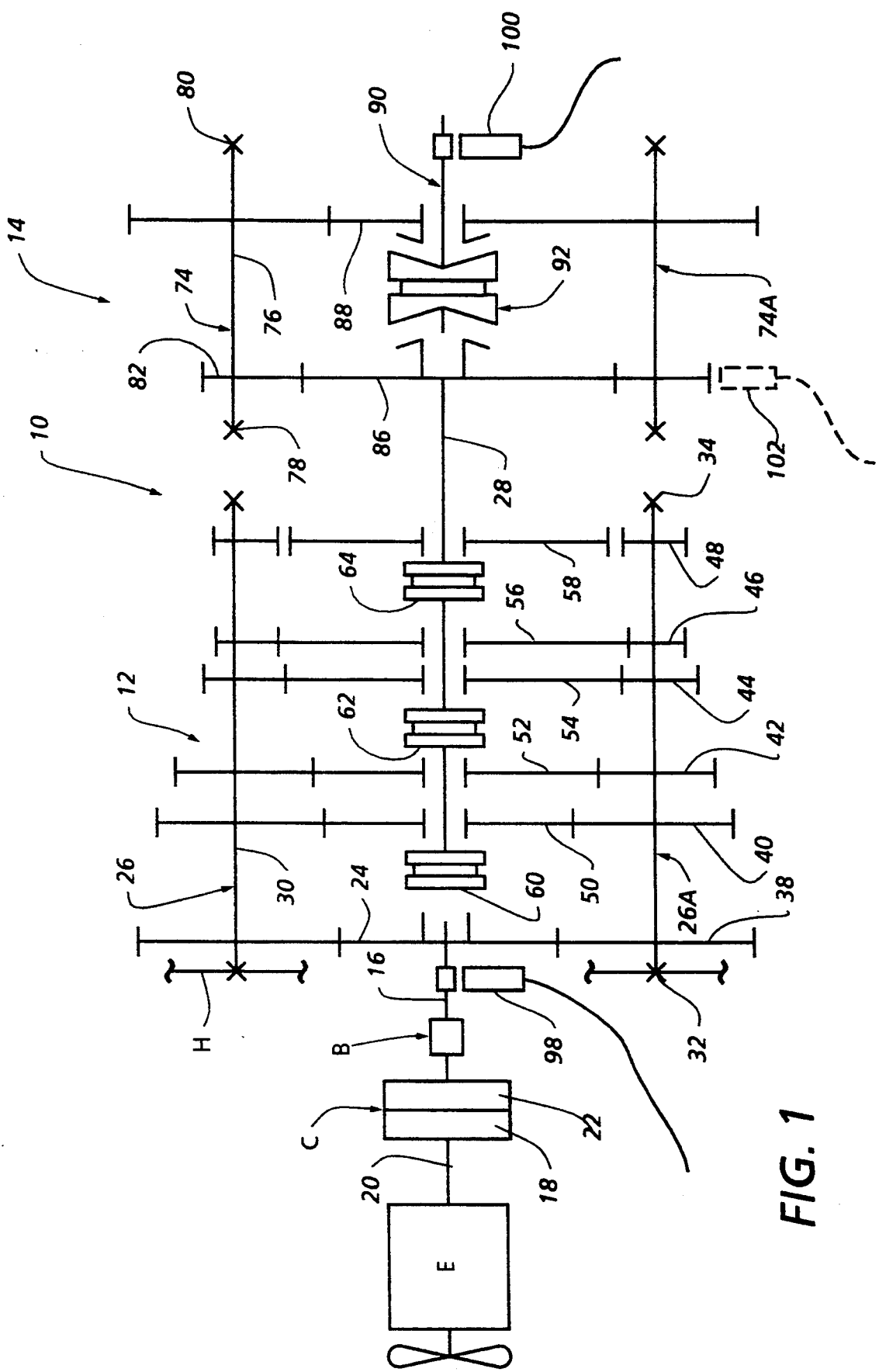
FIG. 1 is a schematic illustration of the vehicular mechanical transmission system partially automated by the system of the present invention.

Referring to FIG. 1, a range type compound transmission 10 of the type partially automated by the semi-automatic mechanical transmission system of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually controlled throttle device (not shown) and the master clutch C is manually controlled by a clutch pedal (not shown) or the like. An input shaft brake B, operated by overtravel depression of the clutch pedal, is preferably provided to provide quicker upshifting as is well known in the prior art.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 is actuated by compressed fluid, such as compressed air, or by electric motors and is of the type automatically controllable by a control unit as may be seen by reference to U.S. Pat. Nos. 4,445,393; 4,555,959; 4,361,060; 4,722,237 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

Figure 1A:
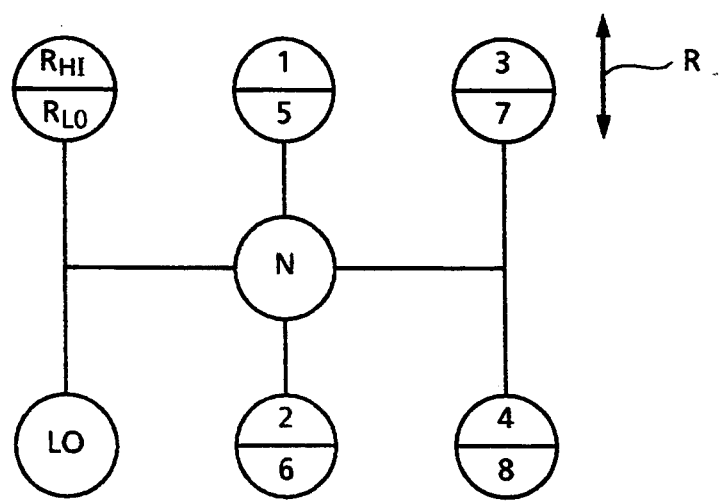
FIG. 1A is a schematic illustration of the shift pattern of the transmission of FIG. 1.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershift type.

For purposes of providing the automatic preselect mode of operation and the semi-automatic shift implementation operation of transmission 10, an input shaft speed sensor and an output shaft speed sensor 100 are utilized. Alternatively to output shaft speed sensor 100, a sensor 102 for sensing the rotational speed of auxiliary section countershaft gear 82 may be utilized. The rotational speed of gear 82 is of course, a known function of the rotational speed of mainshaft 28 and, if clutch 92 is engaged in a known position, a function of the rotational speed of output shaft 90.

Figure 2:
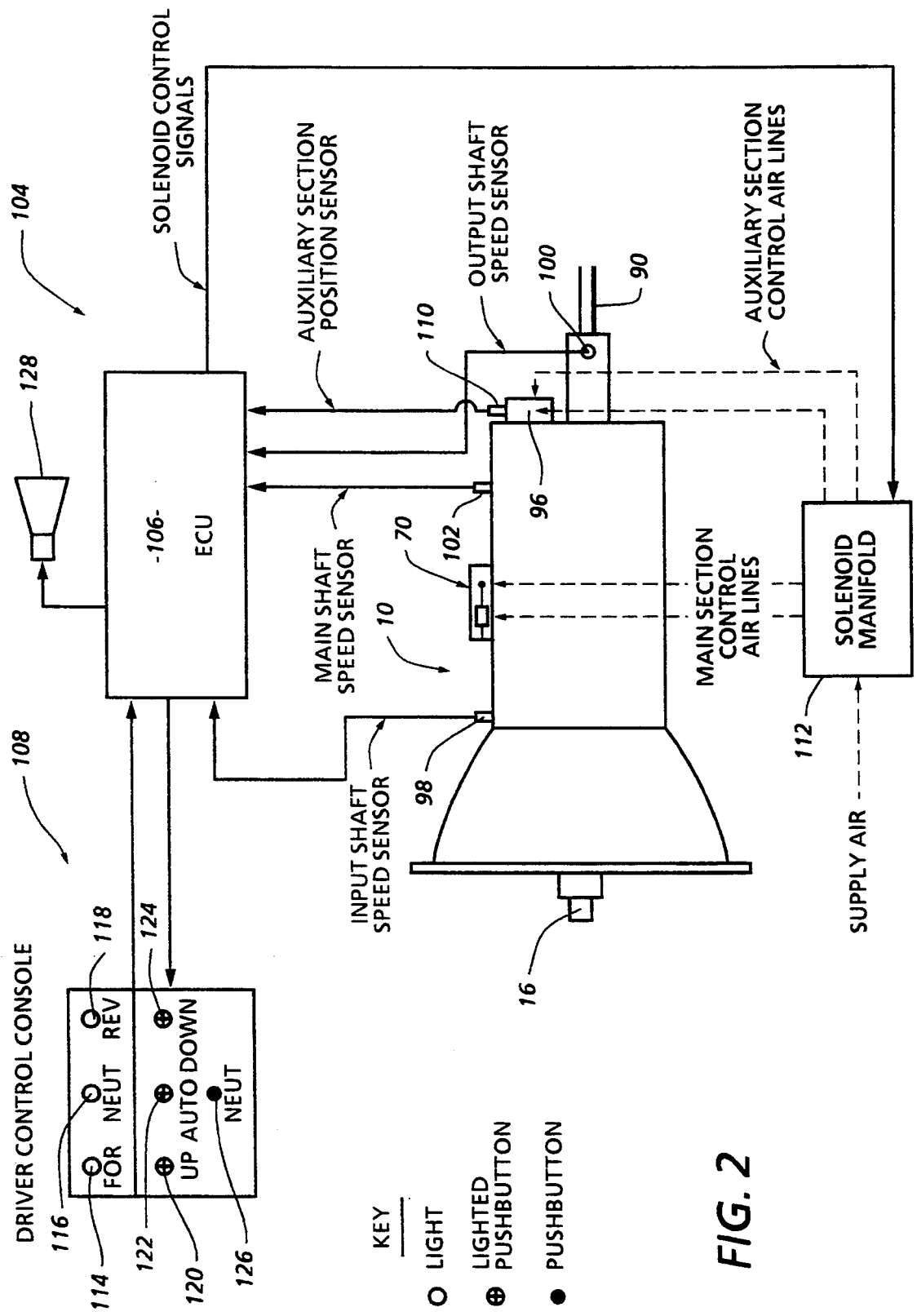
FIG. 2 is a schematic illustration of the automatic preselect and semi-automatic shift implementation system for a mechanical transmission system of the present invention.

The automatic preselect and semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the input shaft speed sensor 98, from the output shaft speed sensor 100 (or, alternatively, the mainshaft speed sensor 102) and from the driver control console 108. The ECU 106 may also receive inputs from an auxiliary section position sensor 110.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108.

In the preferred embodiment, the driver control console allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

A horn or buzzer 128 is provided to give audible prompts to the vehicle operator.

In operation, to select upshifts and downshifts manually, the operator will depress either button 120 or button 124 as appropriate. The selected button will then be lighted until the selected shift is implemented or until the selection is cancelled.

To implement a selected shift, the manifold 112 is preselected to cause actuator 70 to be biased to shift main transmission section 12 into neutral. Completion of the shift into neutral is accomplished by the operator causing a torque reversal by manually momentarily decreasing and/or increasing the supply of fuel to the engine and/or manually disengaging the master clutch C. Preferably, device 128 will be caused to issue an audible shift prompt to the operator upon preselection of a shift into neutral. As the transmission is shifted into neutral, and neutral is verified by the ECU (neutral sensed for a period of time such as 1.5 seconds), the neutral condition indicia button 116 is lighted. If the selected shift is a compound shift, i.e. a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the automatic preselection mode of operation, selected by use of lighted pushbutton 122, the ECU will, based upon stored logic rules, currently engaged ratio (which may be calculated by comparing input shaft to output shaft speed) and output shaft or vehicle speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode and the shift preselected thereby by depression of pushbutton 122.

As an alternative, the neutral condition indication light 116 may be eliminated and neutral selection pushbutton 126 replaced by a lighted pushbutton.

Figure 3:
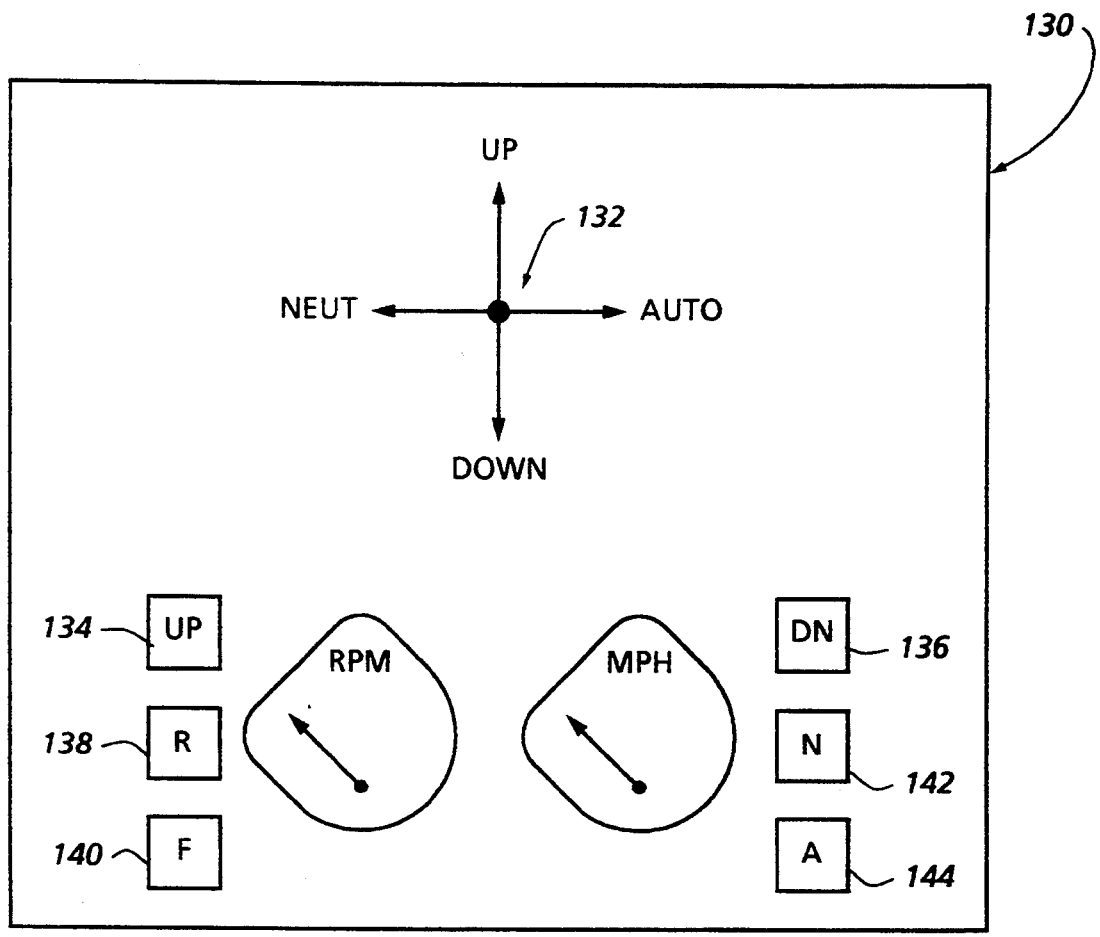
FIG. 3 is a schematic illustration of an alternate control console for the system of FIG. 2.

An alternate driver control and display console 130 may be seen by reference to FIG. 3. A joy stick 132 is movable against a resilient bias from its centered position to select upshifts, downshifts, a shift to neutral or the automatic preselect mode by movement up, down, leftward or rightward, respectively, as indicated. Indicia lights 134 and 136 are lighted to indicate an upshift or downshift, respectively, is preselected. Indicia lights 138 and 140, respectively, are lighted to indicate a vehicle forward or reverse, respectively, mode of operation. Indicia light 142 is steadily lighted to indicate a transmission neutral condition and is flashed to indicate a preselected but not yet confirmed neutral condition. Indicia light 144 is lighted to indicate system 104 is operating in the automatic preselection mode of operation.

Accordingly, it may be seen that a relatively simple and inexpensive semi-automatic shift implementation control system (104)/method for a mechanical transmission system 10 having an automatic preselect mode of operation and requiring only a transmission shift actuator (112/70/96) and two speed inputs to be added to vehicle mechanical transmission system is provided. An electronic control unit 106 for receiving the two speed inputs, and inputs from an operator's console and for issuing command outsignals to the actuators and to the display portion of the operator's console is also provided. The system semi-automatically executes manually or automatically preselected shifts requiring the operator to (i) cause a torque reversal for disengaging the currently engaged ratio and (ii) to cause substantially synchronous rotation for engagement of the selected ratio, which allows the system to operate without requiring automatically operated throttle controls or master clutch actuators.

As indicated above, the driver is alerted or prompted audibly by a single tone that a shift from the currently engaged ratio into a target gear ratio has been initiated by automatic preselection of disengagement of the currently engaged gear ratio. If this prompt is missed or forgotten, the driver may be unaware that the transmission is preselected towards neutral which may resulting additional wear of the yokes or forks, the shifting mechanisms and/or the electronic shift controls and/or actuators due to extended preselect periods.

Figure 4:
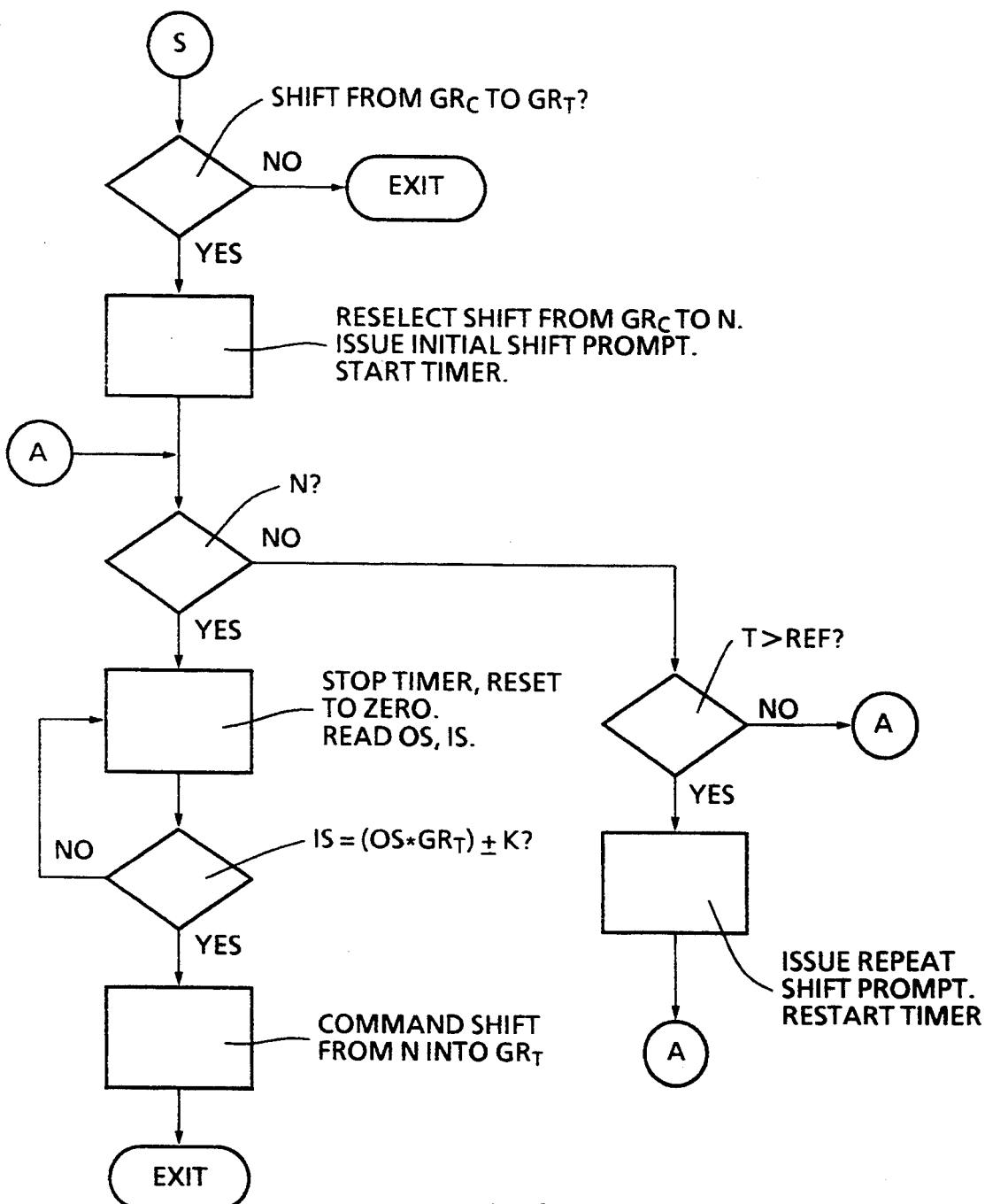
FIG. 4 is a schematic illustration, in flow chart format, of the control system/method of the present invention.

According to the present invention, as may be seen by referenced to FIG. 4, to alleviate extended preselect times, a repetitive shift prompt may be used. If a given amount of time passes after the transmission has been preselected towards neutral for shift without the move to neutral being completed, periodically repeating the shift prompt (audible tone) will remind the driver that a shift has been preselected. The same shift prompt may be repeated or an alternative tone may be used to alert the driver. The shift prompt may be repeated at fixed time intervals or at decreasing intervals to solicit driver action. By repeating the shift prompt the driver is encouraged to complete or to cancel the shift. Either way, the frequency and duration of extended preselect times may be decreased.

The preferred method of implementation of the strategy of the present invention is to provide a single, initial preselect tone and then a double tone at intervals of about 20 seconds until the transmission is shifted into neutral. As an addition to or as a replacement of audible prompts, visual and/or tactile prompts may be utilized.

Although the present invention has been described with a certain degree of particularity, it is understood that various changes to form and detail may be made without departing from the spirit and the scope of the invention as hereinafter claimed.

I claim:

1. A control system (104) for semi-automatic implementation of selected shifts of a mechanical change gear transmission system comprising a manually controlled fuel throttle controlled engine (E) , a multiple speed change gear mechanical transmission (10), a manually controlled master friction clutch (C) drivingly interposed between the engine and the transmission, a first sensor (98) for providing a first input signal indicative of transmission input shaft (16) rotational speed, a second sensor (100) for providing a second input signal indicative of the rotational speed of a transmission shaft (90) independently rotatable relative to the transmission input shaft under at least certain transmission operating conditions, a non-manually controllable transmission actuator (112, 70, 96) for controlling shifting of the transmission, and control means (106) responsive to a selection of a transmission shift from a currently engaged ratio for issuing command output signals to said actuator to bias the transmission to be shifted into neutral and to a signal device (128) to issue an initial shift prompt signal; said control system comprising:
   means for sensing a period of time from initial biasing of said transmission to be shifted into neutral;
   means for sensing for a transmission neutral condition; and
   means responsive to said period of time exceeding a reference value prior to sensing a transmission neutral condition for causing said signal device to issue a reminder shift prompt signal.

2. The system of claim 1 wherein said initial and said reminder shift prompt signals are audible signals.

3. The system of claim 2 wherein said reminder shift prompt signal is audibly distinct from said initial shift prompt signal.

4. The system of claim 2 wherein said means tier causing said signal device to issuing a reminder shift prompt signal is effective to cause said signal device to repetitively issue further reminder shift prompts if transmission neutral is not sensed in a period of time equaling a second reference value since the previous shift prompt.

5. The system of claim 4 wherein said reminder shift prompt signals are audibly distinct from said initial shift prompt signal.

6. The system of claim 1 wherein said reference value is about 20 seconds.

7. The system of claim 1 wherein said means for causing said signal device to issue a reminder shift prompt signal is effective to cause said signal device to repetitively issue further reminder shift prompts if transmission neutral is not sensed in a period of time equaling a second reference value since the previous shift prompt.

8. The system of claim 7 wherein said first reference value is substantially equal to said second reference value.

9. The system of claim 7 wherein said reference value is about 20 seconds.

10. The system of claim 7 wherein said second reference value is smaller than said first reference value.

11. A control method for semi-automatic implementation of selected shifts of a mechanical change gear transmission system comprising a manually controlled fuel throttle controlled engine (E), multiple speed a change gear mechanical transmission (10), a manually controlled master friction clutch (C) drivingly interposed between the engine and the transmission, a first sensor (98) for providing a first input signal indicative of transmission input shaft (16) rotational speed, a second sensor (100) for providing a second input signal indicative of the rotational speed of a transmission shaft (90) independently rotatable relative to the transmission input shaft under at least certain transmission operating conditions, a non-manually controllable transmission actuator (112, 70, 96) for controlling shifting of the transmission, and control means (106) responsive to a selection of a transmission shift from a currently engaged ratio for issuing command output signals to said actuator to bias the transmission to be shifted into neutral and to a signal device (128) to issue an initial shift prompt signal; said control method comprising:
   sensing a period of time from initial biasing of said transmission to be shifted into neutral;
   sensing for a transmission neutral condition; and
   responding to said period of time exceeding a reference value prior to sensing a transmission neutral condition by causing said signal device to issue a reminder shift prompt signal.

12. The method of claim 11 wherein said initial and said reminder shift prompt signals are audible signals.

13. The method of claim 12 wherein said reminder shift prompt signal is audibly distinct from said initial shift prompt signal.

14. The method of claim 12 wherein said means for causing said signal device to issuing a reminder shift prompt signal is effective to cause said signal device to repetitively issue further reminder shift prompts if transmission neutral is not sensed in a period of time equaling a second reference value since the previous shift prompt.

15. The method of claim 14 wherein said reminder shift prompt signals are audibly distinct from said initial shift prompt signal.

16. The method of claim 11 wherein said reference value is about 20 seconds.

17. The method of claim 11 wherein said means for causing said signal device to issue a reminder shift prompt signal is effective to cause said signal device to repetitively issue further reminder shift prompts if transmission neutral is not sensed in a period of time equaling a second reference value since the previous shift prompt.

18. The method of claim 17 wherein said first reference value is substantially equal to said second reference value.

19. The method of claim 7 wherein said reference value is about 20 seconds.

20. The method of claim 7 wherein said second reference value is smaller than said first reference value.

* * * * *